(12) United States Patent
Ohgawara et al.

(10) Patent No.: US 6,407,783 B1
(45) Date of Patent: Jun. 18, 2002

(54) LIQUID CRYSTAL DISPLAY DEVICE

(75) Inventors: Masao Ohgawara, Miyoshi; Shinsuke Iguchi, Hyogo; Masanori Kohno, Kisarazu; Takero Teramoto, Tokyo; Naoki Yokoyama, Kisarazu; Kizo Hattori, Tokyo, all of (JP)

(73) Assignees: Optrex Corporation, Tokyo; Hiroshima Opt Corporation, Miyoshi; Nippon Steel Chemical Co., Ltd., Tokyo, all of (JP)

( * ) Notice: Subject to any disclaimer, the term of this patent is extended or adjusted under 35 U.S.C. 154(b) by 0 days.

(21) Appl. No.: 09/286,442

(22) Filed: Apr. 6, 1999

(30) Foreign Application Priority Data

Apr. 7, 1998 (JP) ............................................. 10-094955
Sep. 17, 1998 (JP) ............................................. 10-262611

(51) Int. Cl.⁷ ...................... G02F 1/1333; G02F 1/1335

(52) U.S. Cl. ..................................................... 349/110

(58) Field of Search .............................. 349/110, 59, 44, 349/153, 155, 190, 186

(56) References Cited

U.S. PATENT DOCUMENTS

| 5,282,068 A | * | 1/1994 | Inaba ........................... 359/54 |
| 5,686,980 A | * | 11/1997 | Hirayama et al. ........... 349/110 |
| 5,714,286 A | * | 2/1998 | Uchikawa et al. ............. 430/6 |
| 5,739,882 A | * | 4/1998 | Shimizu et al. .............. 349/123 |
| 5,879,976 A | * | 3/1999 | Fujiwara et al. ............. 438/163 |
| 6,008,869 A | * | 12/1999 | Oana et al. ..................... 349/43 |
| 6,232,945 B1 | * | 5/2001 | Moriyama et al. ............. 345/98 |

OTHER PUBLICATIONS

Kawachi et al.; "A novel technology for a–Si TFT–LCD's with Buried ITO electrode structure"; IEEE Transaction on electron devices, vol. 41, No. 7, Jul. 1994.*

* cited by examiner

Primary Examiner—Kenneth Parker
Assistant Examiner—Hoan C. Nguyen
(74) Attorney, Agent, or Firm—Oblon, Spivak, McClelland, Maier & Neustadt, P.C.

(57) ABSTRACT

A liquid crystal display device has a light shielding layer 21 at a portion excluding a display pattern on a transparent substrate 12 wherein material for the light shielding layer has an electrical insulation property of not less than $10^{12}$ $\Omega/\square$ in terms of insulation resistance and an optical density (OD value) of not less than 2.0 per a film thickness of 1 $\mu$m.

22 Claims, 3 Drawing Sheets

LIQUID CRYSTAL DISPLAY DEVICE

BACKGROUND OF THE INVENTION

1. Field of the Invention

The present invention relates to a liquid crystal display device. In particular, it relates to a transmissive type liquid crystal display device provided with a back light at its rear side.

2. Discussion of Background

Figure 2:
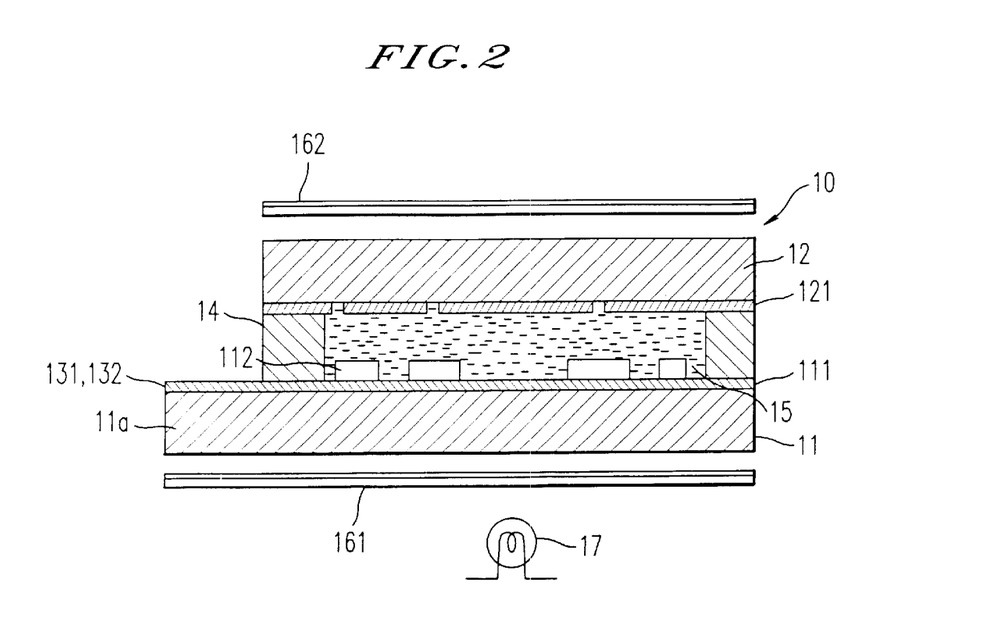
FIG. 2 is a diagrammatical cross-sectional view of a conventional liquid crystal display device in which a light shielding layer formed by a printing method is used.
Figure 3A:
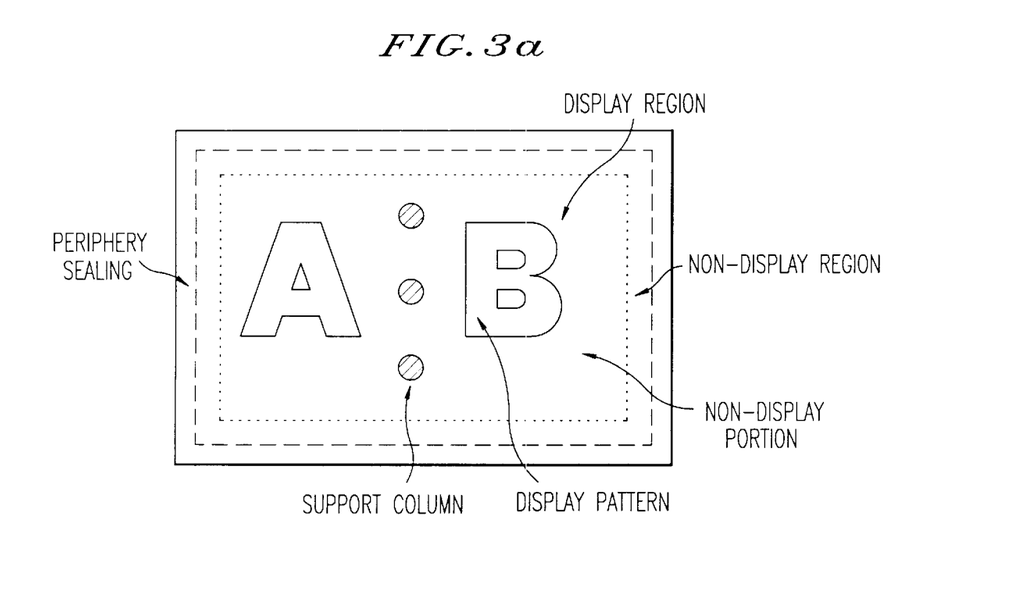
FIG. 3 presents a diagrammatical front view and diagrammatical cross-sectional view of an invention display including a display region, a non-display region and a support column provided in a non-display portion of the display region.
Figure 3B:
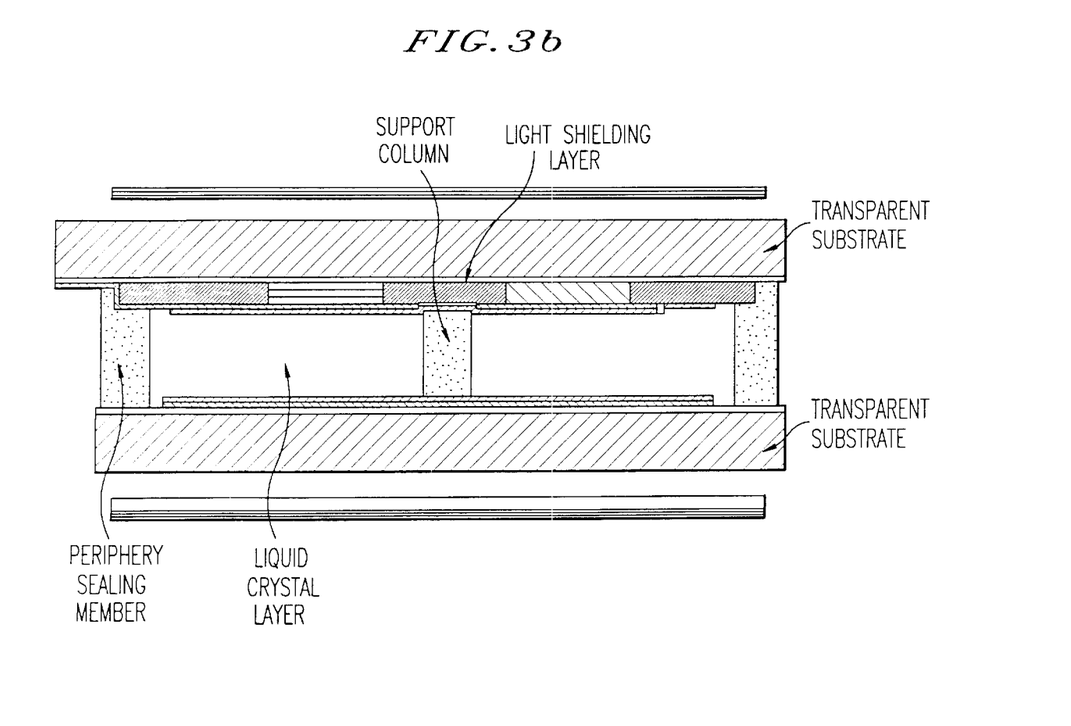
Figure 4:
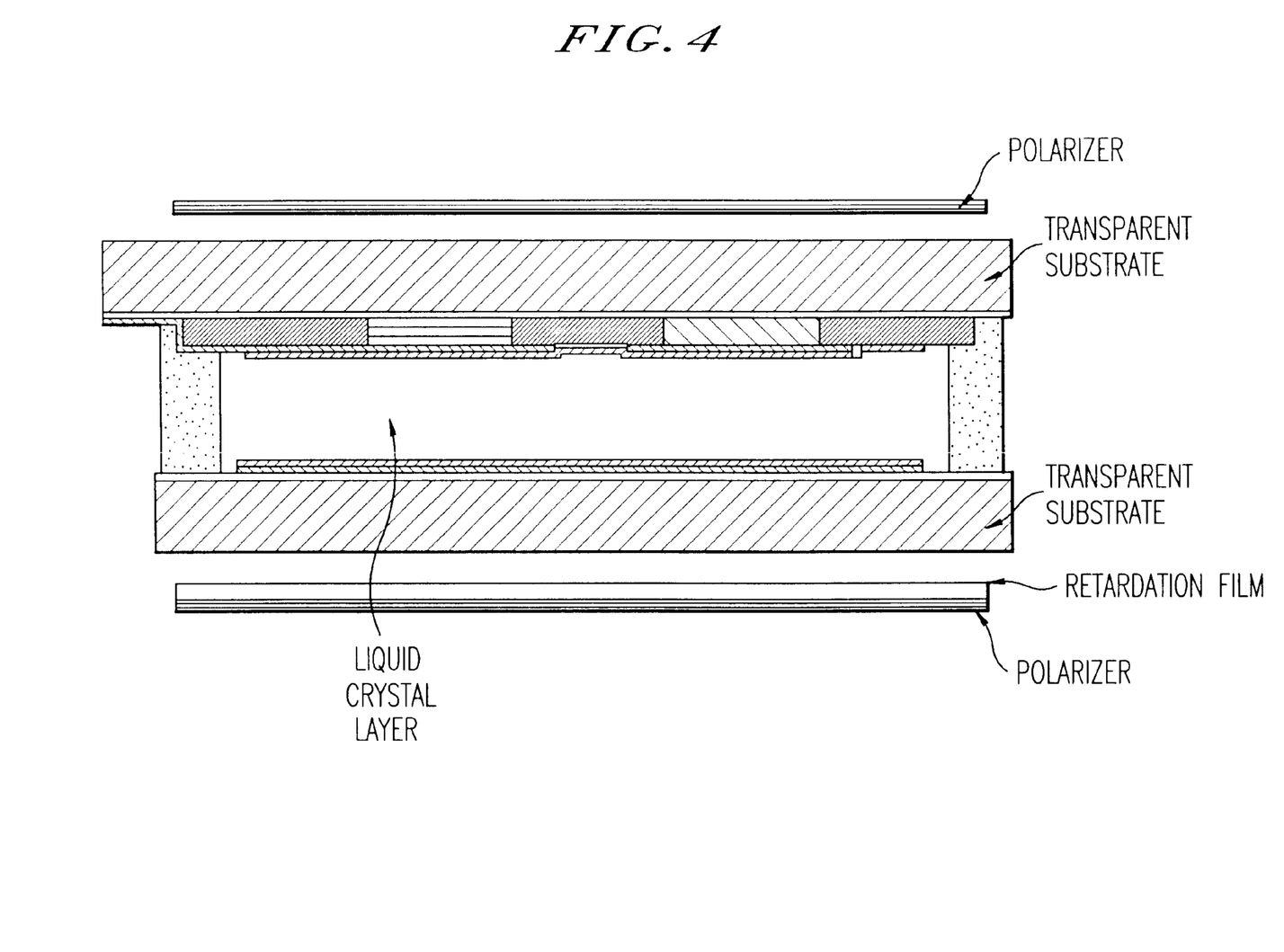
FIG. 4 provides a cross-sectional view of a cell structure suitable for STN and including a retardation film.

In the transmissive type liquid crystal display device provided with a back light at its rear side, a light shielding layer is provided at an inner side of the cell to improve visibility. FIG. 2 is a diagrammatical cross-sectional view of a typical conventional device.

In FIG. 2, a liquid crystal display device 10 comprises a pair of transparent substrates 11, 12 made glass or the like wherein a terminal portion 11a is formed on the transparent substrate 11. Transparent electrodes 111, 121 of ITO (Indium Tin Oxide) each having a predetermined display pattern are formed on the transparent substrates 11, 12 although the figure does not shown in detail. A light shielding layer 112 is provided on the transparent substrate 11 at a position excluding a portion corresponding to the display pattern. On a terminal portion 11a, there are formed a first lead-out electrode group 131 drawn directly from the transparent electrode 111 of the transparent substrate 11 and a second lead-out electrode group 132 connected to the transparent electrode 121 from the other transparent substrate 12.

The transparent substrates 11, 12 are bonded by interposing a periphery sealing member 14 made of an epoxy resin or the like so that the transparent electrodes 111, 121 oppose to each other. Liquid crystal 15 is sealingly put in a cell gap thus produced. The periphery sealing member 14 includes a transfer material of, for instance, conductive beads, and the transparent electrode 121 on the other transparent substrate 12 is connected electrically to the second lead-out electrode group 132 on the terminal portion 11a by means of the transfer material.

Polarizers 161, 162 are disposed at outer surface sides of the transparent substrates 11, 12. In this liquid crystal display device 10, the transparent substrate 11 having the light shielding layer 112 is determined as a rear side, and a back light 17 is provided in rear of the transparent substrate 11. Accordingly, the transparent substrate 12 is to be a top surface side.

In forming the above-mentioned light shielding layer, a printing method was mainly employed to the conventional device. However, in order to obtain a sufficient shielding property of 2 or more in terms of an optical density (OD value) by the printing method, the film thickness of the light shielding layer reached 3—4 µm. Accordingly, there was such drawback that smoothness in the top surface was poor and fine processing could not be performed due to a restriction in accuracy of printing. Accordingly, in an attempt of forming the cell gap to be small, it was only possible to reduce the dimension of the gap to about 6 µm at most due to the restriction on the film thickness by the printing. Further, even in this case, a short-circuit between the opposing transparent substrates and unevenness of the gap often occurred due to protections formed in the light shielding layer by which there were problems of bad yield or a poor quality of products.

Further, as methods for realizing a partial color display by using the cell provided with the light shielding layer at its rear side, there were a method for conducting color-printing to an outer portion of the cell by screen printing, a method for partially coloring by disposing a color filter in an outside portion of the cell and a method for printing a color layer on an inner surface of the cell by screen printing or off-set printing. However, there were problems as follows.

In the method for printing or attaching a color filter to an outer surface of the cell, it was impossible to avoid color shifting due to parallax, and the application of different colors in a fine pattern was difficult, whereby it was only possible to form a rough pattern having the intervals of line of about 1 mm or more. Further, in the method for disposing a color filter in the cell by printing, the printing should be conducted on the ITO; transparent electrode, and accordingly, a voltage was applied to the liquid crystal layer through the color filter, which deteriorated the threshold property. Further, there was a method for changing colors to be displayed by forming sections having different colors in a color polarizer. However, this method was too expensive to use.

On the other hand, there has been well known a technique to prepare a color filter with use of a black resist and a color resin, which has become practical for a full dot display such as a large sized display using STN (Super Twisted Nematic), TFT (Thin Film Transistor) or the like.

The light shielding layer used for the color filter for TFTs does not require electrical insulation properties, and it is rather preferred to have a certain degree of conductive properties. It is because when an ITO film is formed on the color filter, the conductive properties of the light shielding layer compensate the ITO film having insufficient conductive properties and exhibit excellent operating characteristics even though the ITO film has a relatively high resistance value.

On the other hand, in a case of using a color filter for STN in which an ITO film having a stripe-like patterning on the color filter, it is not preferable to have conductive properties from the viewpoints of assuring electrical insulation properties between lines and reduction in the electrostatic capacity. However, the smoothness of the top surface is an important factor for the color filter used for STN, and therefore, it is necessary to form a insulating smoothing layer of resin on the color filter.

Since the resin having a insulating smoothing layer has electrical insulation properties, use of the light shielding layer having low electrical insulation properties on the color filter does not create a big problem. Namely, although a certain material having high insulation properties and high light absorbance was known, persons have not found any usage to the material having such excellent characteristics.

Further, the bonding strength between the transparent substrate and the light shielding layer formed by printing was insufficient, and it was impossible to print the periphery sealing member on the light shielding layer. Accordingly, when a display portion of a liquid crystal panel mounted on an automobile is observed from an oblique direction and if the angle of visibility is too deep to be out of the light shielding layer, the light of the back light may leak.

In order to prevent such disadvantage, a black ink was printed on a region of a top surface of the cell including a portion corresponding to the periphery sealing member into a flame like shape so as to prevent the leakage of light. However, this technique inevitably increased the number of processes. Besides the abovementioned problem, there was proposed a color display system to display different colors by driving the cell at a low duty ratio. However, this technique had the problem as follows. Namely, in using the method for printing the color filter or bonding the color filter on an outer portion of the cell, it is necessary to broaden the distance between patterned portions in order to prevent colors from mixing due to parallax, and accordingly, it is impossible to provide precisely divided colors.

On the other hand, in the method for printing the color filter in an inner surface of the cell, the color purity was poor although there was no problem in precision, and reliability was low. Even in the method for printing the color filter in an inner surface of the cell, it was necessary for the light shielding layer formed by printing to have a film thickness of 2–4 µm to obtain a sufficient absorbance, and therefore, the production of an uneven film thickness was unavoidable. Accordingly, an unevenness of cell gap was resulted whereby there was a scattering of characteristics on final products. Further, there was a limit on precision in using the printing method; it was very difficult to design a pattern as fine as 200 µm or lower when different color should be provided in each side, and there was also a restriction in design. Further, when a pre-tilt angle is 2° or less in a twisted nematic liquid crystal, a domain is produced due to the unevenness of the inner surface of the cell. Accordingly, a reduction of the pre-tilt angle for the purpose of improving the characteristics could not be realized. Further, since the smoothness of the top surface of the conventional cell was poor, the STN system or a ferrodielectric or antiferrodielectric liquid crystal system could not be employed although the driving with a duty of about 1/30 was in fact desired.

Further, when a thermoset resin was used for the periphery sealing member, a central portion of the cell was apt to be in a swelling state after the curing of the periphery sealing member due to a difference of the thermal expansion coefficient between the sealing member and the glass substrate. Even though liquid crystal sealingly injected into the cell, the swelling state of a central portion remains as it is, whereby there may be differences in the characteristics and a background color between the central portion and peripheral portions.

In order to prevent such disadvantage concerning, in particular, a large-sized panel or a STN system wherein the unevenness of the cell gap affecting adversely the optical characteristics, it was necessary to conduct pressure-sealing operation. Namely, liquid crystal was injected into the cell. The liquid crystal layer was in a pressure reducing state and was sealed under the condition that the gap in the central portion and the peripheral portion of the cell was made uniform.

Further, in a liquid crystal display device using a smectic liquid crystal such as a ferrodielectric liquid crystal or an antiferrodielectric liquid crystal, the liquid crystal may not be used again due to a stress after the sealing, an impact or vibrations because the liquid crystal does not have a self-recovering property on orientation. Accordingly, when the orientation was once disturbed, it was necessary to conduct a heating treatment depending on a degree of disturbance to thereby obtain a desired orientation.

In order to solve the above-mentioned problems, there is a method for providing a resin layer having heat softening properties around spacers and fuse-bonding upper and lower substrates at the time of curing the periphery sealing member. This method, however, had such problems that it was necessary to increase an amount of the spacers and an amount of the heat-softening resin to obtain a sufficient fixing effect, which might cause leakage of light due to the scattering and gathering of the spacers themselves and a deterioration of appearance. Further, the components of the heat-softening resin might resolve to the liquid crystal to thereby reduce the reliability.

It is an object of the present invention to provide a liquid crystal display device with a light shielding layer which provides an excellent quality of display and an excellent appearance of the product.

In accordance with the present invention, there is provided in a transmissive type liquid crystal display device comprising a liquid crystal layer, a pair of transparent substrates opposed to each other and bonded to a periphery sealing member so as to interpose the liquid crystal layer, a polarizer placed at an outer surface of each of the transparent substrates, an illumination means provided in rear of a polarizer at a back surface side with respect to a display surface side, a light shielding layer provided in an inner surface of one of the transparent substrates at positions corresponding to a non-display region and a non-display portion excluding a portion corresponding to a display pattern in a display region, and a transparent electrode formed on the display region, wherein a voltage sufficient to activate the liquid crystal layer is applied to a desired portion of the transparent electrode on the display pattern, said liquid crystal display device being characterized in that: the non-display portion in the display region has a plurality of sections of not less than 1 mm×1 mm; the light shielding layer is made of a photosensitive light shielding resin in which patterning is conducted, which has the electrical insulation property of not less than $10^{12}$ Ω/□ (surface resistance) in terms of insulation resistance and an optical density (OD value) of not less than 2.0 per a film thickness of 1 µm.

According to the present invention, the transparent electrode can be formed directly on the light shielding layer without interposing an insulating smoothing layer.

As a characteristic feature according to the present invention, the light shielding layer in the display region has a plurality of sections of not less than 1 mm×1 mm and a support column made of the same material as the peripheral sealing member is provided on at least a part of the light shielding layer.

As a typical example of a display pattern wherein a non-display portion in the display region has a plurality of sections of not less than 1 mm×1 mm, there is a segment type pattern such as, for example, a pattern of seven segments numeric display. However, there is another example of pattern in which a dot pattern is mixed therewith, for example, a section of 5×7 dots is repeatedly provided with certain spaces.

As a characteristic feature of the present invention, a light transmitting film is made of photosensitive resin in which patterning is conducted, which light transmitting film permitting a predetermined color of light to pass therethrough is formed to cover a portion corresponding to the display pattern, and the light transmitting film is made of a resinous material having an insulation resistance of not less than $10^{12}$ Ω/□. According to the present invention, the transparent electrode can be formed directly on the light shielding layer and light transmitting layer without interposing a insulating smoothing layer.

In accordance with an aspect of the present invention, the liquid crystal layer is a nematic liquid crystal layer having a twist angle of about 90° between the transparent substrates; said pair of polarizers are so arranged that their polarizing axes are in parallel, and the pre-tilt angle formed between the liquid crystal layer and the transparent substrates is 1.5° or less.

In the above-mentioned aspects of the present invention, the liquid crystal layer is a nematic liquid crystal layer, and a duty ratio for driving the nematic liquid crystal layer is 1/1–1/33.

In accordance with an aspect of the present invention, the liquid crystal layer is a nematic liquid crystal layer having a twist angle of 90° between the transparent substrates; said pair of polarizers are arranged so that their polarizing axes intersect at a right angle, and the product $\Delta nd$ of the refractive index anisotropy $\Delta n$ of the nematic liquid crystal and the distance d between the transparent conductive films which form the display pattern is in a range of 4–6 $\mu$m.

In accordance with an aspect of the present invention, the liquid crystal layer is a nematic liquid crystal layer having a twist angle of 70–80 degree between the transparent substrates; said pair of polarizers are arranged so that the crossing angle formed by their polarizing axes is 70–80°, and the product $\Delta nd$ of the refractive index anisotropy $\Delta n$ of the nematic liquid crystal and the distance between the transparent conductive films whice form the display pattern is in a range of 4–6 $\mu$m.

In accordance with an aspect of the present invention, the liquid crystal layer is a nematic liquid crystal layer wherein the twist angle between the transparent substrates is about 90° or 70–80°, the duty ratio for driving the nematic liquid crystal layer is 1/1–1/4.

In accordance with an aspect of the present invention, the liquid crystal layer is a nematic liquid crystal layer having a twist angle of 180–270° between the transparent substrates; a retardation film is disposed between at least one of the polarizers and a transparent substrate opposing thereto, and said pair of polarizers are arranged so that light shielding and light transmitting are switched by applying a voltage.

In accordance with an aspect of the present invention, the liquid crystal layer is a ferrodielectric liquid crystal or an anti-ferrodielectric liquid crystal; said pair of polarizers are arranged so that their polarizing axes intersect at a substantially right angle, and light shielding and light transmitting are switched by applying a voltage.

Since the adhesive properties of the light shielding layer to the transparent substrate is excellent, it can be provided between the peripheral sealing member and the transparent substrate and also the outer edge of the shielding layer is inside of the sealing member.

As a characteristic feature of the present invention, when a TN (Twisted Nematic) system is used for displaying a negative display, a nematic liquid crystal added with a dichroic dye is used to improve the contrast ratio.

As the illumination means, it is preferred to use a white color light source such as a white LED (light emission diode) having the spectra of three colors of R, G and B or a white CCT although a tungsten lamp, a Xenon: lamp, EL or the like, which has conventionally been used, is usable.

Further, the resinous material having black pigment may be a resinous material obtained by polymerizing a resin composition including an acid adduct of alkali-soluble epoxy acrylate including insulating carbon. Further, the resinous material for the light transmitting layer may be a resinous material obtained by polymerizing a resin composition including an acid adduct of alkali-soluble epoxy acrylate. Further, the light shielding layer is provided below a lower portion of the periphery sealing member, and the edge portion of the light shielding layer is within the width of the periphery sealing member over the entire periphery.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Preferred embodiments of the present invention will be described with reference to the drawings.

Figure 1:
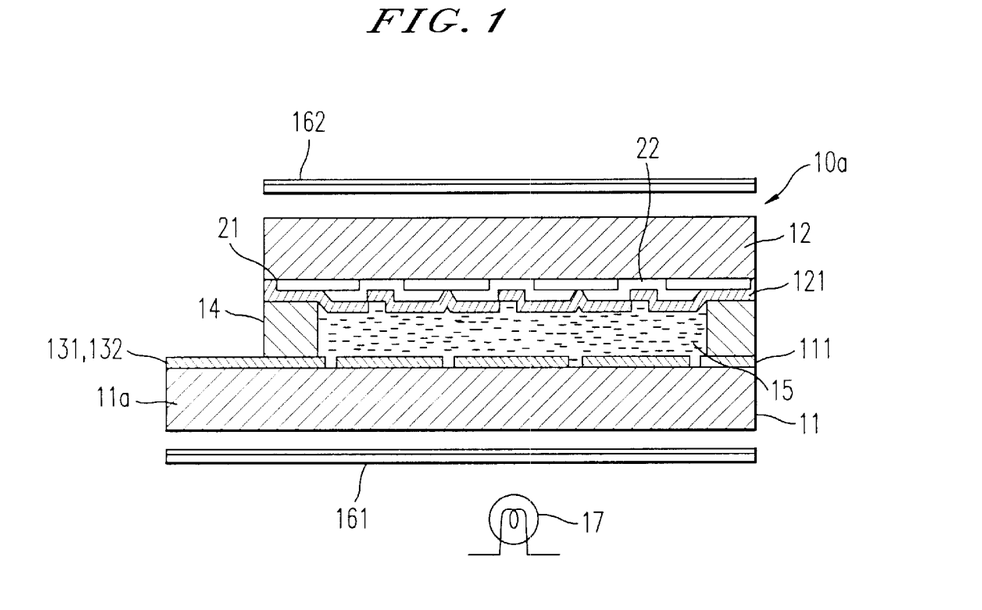
FIG. 1 is a diagrammatical cross-sectional view showing an embodiment of the liquid crystal display device according to the present invention.

FIG. 1 shows a liquid crystal display device 10A as an embodiment of the present invention wherein the same reference numerals designate the same or corresponding parts.

In this embodiment, transparent substrates 11, 12 prepared by attaching an alkali-preventing layer of silica onto each of a glass substrate were used. First, on the transparent substrate 12 used as a top surface side, a photosensitive resin material having black pigment (V-259BKIS-H (tradename) by Nippon Steel Chemical Co., Ltd.), i.e., a resin composition including an acid adduct of alkali-soluble epoxy acrylate as a resin component and insulating carbon was coated by a spin coat method to have a thickness of about 1 $\mu$m.

Then, with use of a photomask which covered a display portion of segment display type and a portion outside from the periphery sealing member 14 which was located at the periphery of the transparent substrates 11, 12, light exposure of 300 mJ was conducted. Then, developing, drying and baking were conducted whereby a light shielding layer 21 was formed on the transparent substrate 12. The light shielding resin material by Nippon Steel Chemical Co., Ltd. exhibited an OD value of about 3.0 per a thickness of 1 $\mu$m, and had a sufficient absorbance. A roll coater, bar coater, slit coater or the like may be used for the coating. However, an uneven film thickness causes an uneven cell gap. Further, when the light transmitting film is formed, the uneven film thickness easily causes discoloration. Accordingly, the, spin coating is desirable. However, the bar coater or the slit coater may be used together in order to reduce an amount of liquid used. Any method of coating is employable as far as it can provide a uniform film thickness.

The light shielding layer is composed of a carbon black coated, a resin component such as polymeric monomer, oligomer or the like, a photopolymerization initiator, solvent and so on. The resin component may be a common photosensitive resin component, specifically a photopolymerizable compound having an ethylenically unsaturated group, or an alkali-developable $\alpha$, $\beta$-unsaturated carboxylic and or its ester or a copolymer prepared by using such an acid or ester preferably an acid adduct of epoxy acrylate of a bisphenol such as bisphenol fluorene, as disclosed in JP-A-8-278629.

It is possible that only the light shielding layer 21 is formed, and coloring is made by printing or attaching a color filter to an outer portion of the cell. In this embodiment, however, in order to provide desired colors on an inner surface of the cell, a photomask was prepared so that a color filter as a light transmitting layer was formed in a segment type display portion, color resin of R, G and Y (V-259R-H, V-259G-H and V-259Y-H by Nippon Steel Chemical Co., Ltd.) were successively applied by spin coating followed by light exposure, developing, drying and baking to thereby form light transmitting layers 22. With use of such materials, it is possible to provide a cell wherein there is no change of color in a temperature range to about 250° C. even after conducting a film-forming step for the transparent conductive film and a cell-forming step. Accordingly, light transmitting layers having a high chroma and showing excellent colors in combination of a back light as a white light source can be provided.

Further, in order to present desired colors including colorless (white), color arrangement can be made by selecting, on demand, from several kinds of original color previously prepared. As basic colors, it is desirable to prepare at least 6 kinds of color such as red, blue, green, yellow, purple and clear. It is preferred to use a clear resin from a viewpoint of smoothing an inner surface of the cell even though there is a portion where coloring is unnecessary. In this case, in order to reduce the difference of the light transmittance between the clear resin and a colored portion, a small amount of pigment should be added to the clear resin to thereby reduce the light transmittance of the clear resin to about 70%. The pigment is not in particular limited as far as it is easily available, and it has a high chroma without scattering properties.

The light shielding layer 21 may be so placed that it extends beneath the periphery sealing member 14 or it does not extend beyond an outer edge (liquid crystal layer side) of the periphery sealing member 14 in the liquid crystal cell. In the structure that the light shielding layer 21 extends beneath the periphery sealing member, the periphery sealing member 14 is concealed by the light shielding layer in view from the side of the transparent substrate 12 through the light shielding layer, and accordingly, an effective surface area of the display portion of the cell can be wide. In this case, it is preferable from a viewpoint of preventing a reduction in the sealing strength that the edge portion of the light shielding layer is within the width of the periphery sealing member over the entire periphery. With such structure, the sealing strengths in the initial state and after a durability test under high temperature and a high humidity (80° C., 90%, 50 hours) were respectively 5.6 kgf and 4.7 kgf. On the other hand, the sealing strengths under the same condition, provided that the edge portion of the light shielding layer is extended beyond the outer edge of the sealing member, were respectively reduced to 3.5 kgf and 2.3 kgf.

Conventionally, for the purpose of obtaining a wide opening in the display area, a black flame is often formed on the polarizer at a front side of the cell by screen printing to conceal the portion corresponding to the periphery sealing member 14. In this embodiment, however, the light shielding layer 21 is extended beneath the periphery sealing member 14, whereby the printing step can be eliminated to reduce cost for manufacturing. Further, in order to prevent completely the leakage of light from the periphery sealing member, a periphery sealing member having black pigment can be used.

As in this embodiment, when the light transmitting layer 22 is formed on the light shielding layer 21, it is preferable that the light transmitting layers 22 are not extended beyond the inner edge of the periphery sealing member 14. In designing the cell so that the light transmitting layers 22 overlap the light shielding layer 21, the overlapping portion of the light transmitting layers 22 is not seen when the cell is observed from a side of the light shielding layer 21. However, when the cell is observed from a side of the light transmitting layers 22, the shape of the arrangement of the light transmitting layers 22 can slightly be observed.

The light transmitting layers 22 formed only in the display portion is not preferable because the outline is observed. To avoid such drawback, respective colors of the light transmitting layers 22 should not be overlapping with each other and distances of the colors should not be so wide wherein the gap in designing be not more than 0.5 mm.

When a display is observed from a side of the light shielding layer, the boundary portions of different colors are concealed by the light shielding layer. Accordingly, there is no problem of the dimension of the gaps from the viewpoint of visibility, and designing in an overlapping state is possible. For example, when there is a gap of about 5 $\mu$m, the covering of the photoresist for patterning the transparent electrode in that portion is insufficient thereby causing the breakage of a wire. Therefore, if there is an allowance in the uniformity of gaps in the cell, designing to provide an overlapping state is preferred.

In a case that the light shielding layer 21 is formed so as to extend below the periphery sealing member 14 on the transparent substrate 12, the transparent electrode 121 is formed on the light shielding layer 21 and the light transmitting layers 22. Since these layer,3 are insulating layers having an insulation resistance of not less than $10^{12}$ $\Omega/\Box$, it is unnecessary to provide a protective layer for the insulation. The insulation resistance between wires should be not less than $10^{11}$ $\Omega/\Box$. In this condition, liquid crystal ON state at unexpected segments does not take place in the liquid crystal cell manufactured.

On the color substrate thus formed, a transparent conductive film was formed by sputtering under a substrate temperature of about 230° C. The surface resistance value depends on designing of patterning, but it is preferred to have a value from about 100 $\Omega/\Box$ to about 10 $\Omega/\Box$. A photoresist was applied to the substrate. A photomask was placed on the photoresist to cover a wiring portion so that a voltage was applied to a portion of the display pattern. After UV light exposure and developing were conducted, an unnecessary portion of ITO film was removed by an etching liquid, and further, the resist was removed by an aqueous NaOH solution to thereby prepare the transparent electrode 121.

Since the materials for the light shielding layer and the light transmitting film are treated by the etching liquid and the resist-removing liquid in the steps for manufacturing the color substrate, these materials should have durability to such chemical liquids.

When the liquid crystal cell is observed from a side of the light shielding layer 21, light transmits through only a portion where no light shielding layer is formed. Further, even when the cell is observed by utilizing reflection of light, a pattern of wiring portion is not observed since no transparent electrode exists between the light shielding layer and the glass substrate. However, when the cell is observed from a side of the transparent substrate 11 which opposes the substrate provided with the light shielding layer 21 under a condition of regular reflection, a pattern of transparent electrode extended on a top surface of the light shielding layer 21 can be observed.

In order not make the extended pattern of transparent electrode conspicuous, it is preferred that the gap between adjacent wires in the transparent electrode is about 100 µm. Although it is preferred to obtain such narrow gap in every portion of the pattern, the formation of the narrow gap is sometimes impossible due to a restriction in designing. In this case, the proportion of covering of the transparent electrode should be 90% or more in rough determination. The proportion of covering is preferably be high.

When there is an allowance in space at the periphery of the display portion and the light shielding layer 21 is not formed beneath the periphery sealing member 14, the light shielding layer may be formed after the transparent electrode pattern has been formed on the transparent substrate. In this case, it is preferable that a side of the transparent substrate 11 which opposes the substrate 12 provided with the light shielding layer 21 is to be a display surface. Such construction suppresses a phenomenon that the transparent electrode pattern becomes conspicuous when the back light is not actuated, and an good appearance of product can be obtained.

Regarding the opposing transparent substrate 11, an alkali-preventing layer and a transparent electrode were successively formed on a glass substrate to prepare a transparent electrode substrate. An aligning film for providing a pre-tilt angle of 1°–1.5° is preferably used for the transparent substrate 12 on which the light shielding layer 21 and the light transmitting layers 22 are formed. In a case of a TN element, it is known that the visual angle can be increased by making the pre-tilt angle small. However, such technique could not be utilized since the light shielding layer formed by using the conventional printing method is thick and surface roughness is also large whereby a small pre-tilt angle such as 1°–1.5° may cause a reverse tilt domain. On the other hand, the light shielding layer 21 formed by the method in the present invention permits the application of a pre-tilt angle of 1.5° or less. Any kind of aligning film exhibiting such pre-tilt angle car be used.

The aligning film having a film thickness of about 600 Å shows an excellent aligning performance and does not adversely affect the electrooptical properties. It is also preferable for the opposing transparent substrate 11 to form the aligning film after an inorganic type insulating film mixed with titania and silica has been formed by a sol-gel method, and then, to conduct a rubbing treatment. The inorganic film is effective for preventing short circuiting between the opposing surfaces.

In this embodiment, spacers were scattered on the transparent substrate 12, and the periphery sealing member 14 was formed on the opposing transparent substrate 11 at a portion corresponding to a peripheral portion of the cell, by a screen printing method. The periphery sealing member 14 may be such one that conductive beads are mixed as a transfer material in order to obtain a conductive state between the transparent substrates 11, 12. The conductive beads may be mixed in only a limited portion to obtain a conductive state or may be mixed in the entire portion of the sealing member 14 in a flame-like form.

A central portion of the cell is easily swollen, and accordingly, it is preferred to provide a sealing lo material in a support column-like shape in at least a part of the cell, which corresponds to the light shielding layer, in particular, a cell in which an uneven cell gap easily takes place (for example, the distance between the sealing member and the display portion is 10 mm or more and the shape of the cell is substantially square), a cell having a low gap (for example, a cell gap of 5 µm or less), a cell subjected to a pressure sealing, step to eliminate the unevenness of the cell gap, or a cell in which the orientation of the liquid crystal layer is easily disturbed due to an external stress, a shock or vibrations (for example, a ferrodielectric liquid crystal or an antiferrodielectric liquid crystal). In this case, the sealing material used should be of the same material as the periphery sealing member. When the conductive beads are mixed in the periphery sealing member, the sealing material in a support column-like shape should be disposed at a portion where the upper and lower electrodes do not oppose.

These transparent substrates 11, 12 were placed opposing each other. They were cured by a thermo-compression bonding method; an injection hole and terminal portions were formed; a nematic liquid crystal was injected into the cell by a vacuum injection method, and a UV curing epoxy resin was applied to the injection hole to seal the hole. Then, in the same manner as the conventional technique, polarizers 161, 162 were arranged at outer sides of the transparent substrates 11, 12. Further, a back light 17 was disposed at a rear side of the polarizer 161 which constitutes a rear side side.

TN or STN can be applied for displaying the liquid crystal display device.

As a display mode for the liquid crystal display device, TN or STN is applicable. Although a negative display or a positive display can be obtained by using TN in combination of the polarizers, either mode can be combined. In designing Δnd, either of about 0.48 µm as a so-called first minimum or about 1.1 µm as a so-called second minimum can be used. Further, the designing of the third minimum (about 1.7 µm) or higher may be taken.

In the conventional technique using TN to provide a negative mode, irregularity in color was apt to occur when Δnd is about 0.48 µm, and it was difficult to obtain an excellent display performance. In the present invention, since the uniformity of the cell is excellent, there is no such restriction. Further, in a case of using a positive mode, it is general to use Δnd of about 0.48 µm. In this case, however, it is necessary to determine the absorbance of the light shielding layer to be 2.5 or more, and only a film thickness of about 4 µm was necessary for the light shielding layer using the conventional printing technique. Accordingly, it was practically impossible that the cell gap was smaller than 6 µm, and accordingly, a special liquid crystal having Δn of not more than 0.1 should be chosen in order to obtain Δnd of about 0.48 µm.

On the other hand, in the present invention, a light shielding layer of not more than 1 µm can be used, and a cell gap of not more than 5 µm, or not more than 3 µm depending on circumstances, can be realized. Accordingly, the value Δn can be increased, and the kind of liquid crystal material usable can be broadened as well as the improvement of the characteristics.

In a case of a positive mode, a retardation film is provided between a polarizer and a transparent substrate, to reduce visual angle dependency. As a typical retardation film providing such function, there is proposed "wide view" manufactured by Fuji Photo Film Co., Ltd. in which a discotic liquid crystal is used.

A method for obtaining a plurality of cells from the mother substrate, i.e., a multi-patterning method, has generally been conducted. In this case, such an arrangement that a pair of opposing substrates wherein an F plate having a pattern which is provided with a light shielding layer at a side of observer and an R plate having a pattern which is provided with a light shielding layer at the opposite side of observer are alternately arranged, may be used. In this case, transparent electrodes are formed so as to correspond to the F and R patterns of the light shielding layers. According to this method, connecting portions to be disposed is not produced in the portion between the formed liquid crystal cells to improve efficiency in manufacturing the substrates. In addition, the manufacturing steps can be shortened and yield can be improved because the number of cutting operations can be reduced.

A light source for the illumination means provided in rear of the polarizer at a rear side in the present invention, may be an ordinary tungsten lamp, EL or the like. However, a white light source such as LED or CCT having the spectra of R, G and B is preferably used from the viewpoint of obtaining a high chroma in the color layer.

Now, the present invention will be described in detail with reference to examples. However, it should be understood that the present invention is by no means restricted by such specific examples.

EXAMPLE 1

A substrate obtained by forming an alkali-preventing layer of silica on a glass substrate by sputtering to have a thickness of about 200 Å was used. The material for a light shielding layer (V-259BKIS-H manufactured by Nippon Steel Chemical Co., Ltd.) was coated on the substrate to form a layer of about 1 μm thick by a spin coating method. Light exposure of 300 mJ was conducted by using a photomask which covered a display portion of segment type and a portion extended from the outside of the periphery sealing member to be provided at the periphery of the liquid crystal cell. After the light exposure, developing, drying and baking were conducted. The OD value of the film was 3.0 and the insulation resistance value was $1 \times 10^{14}$ Ω/□.

For providing desired colors, three photomasks were prepared so as to form light transmitting layers in segment portions, and color resins of R, G and Y (V-259RH, V-259G-H and V-259Y-H manufactured by Nippon Steel Chemical Co., Ltd.) were coated successively, followed by conducting exposure, developing, drying and baking. The insulation resistance of each of the light transmitting films was $3 \times 10^{14}$ Ω/□. These light transmitting layers were formed to cover a portion slightly smaller than an outer contour of the cell so as not to contact with the periphery sealing member. The gap between the colors was 0.3 mm so that there was no overlapping of the colors.

On the color substrate thus formed (the first substrate), an ITO; transparent conductive film of about 1,000 Å was formed at 230° C. by a sputtering method. The surface resistance was about 30 Ω/□. A photoresist was coated on the substrate, and then, light exposure and developing were conducted with use of a photomask which covered a portion of wiring so that a voltage is applied to the segment type display portion. An unnecessary portion in the ITO film was removed by an etching liquid, and the resist was removed by an aqueous NaOH solution whereby a transparent electrode was formed. On another substrate to be opposed (the second substrate), an alkali-preventing layer and an ITO; transparent conductive film were formed successively in the same manner as the above whereby a transparent electrode was formed.

On the first substrate on which the light shielding layer and the light transmitting layers were formed, a film having a thickness of about 600 Å was formed by a transfer printing method with use of an aligning film for providing a pre-tilt angle of 1.3°. In order to form an inorganic type insulation film mixed with titania and silica on the second substrate, a film printing work was conducted by a sol-gel method. Then, an aligning film was formed and baked in the same manner as above. A rubbing treatment was conducted to the first and second substrates so that a twist angle of 90° was formed between the substrates.

On the first substrate, spacers having a diameter of 6 μm (manufactured by Sekisui Fine Chemical Co., Ltd.) were scattered. On the second substrate, Structbond (tradename) (manufactured by Mitsui Chemicals, Inc.) was printed by a screen printing method to form a periphery sealing member in a portion corresponding to a peripheral portion of the liquid crystal cell and a display portion which was covered by the light shielding layer. 3% of conductive beads (manufactured by Sekisui Fine Chemical Co., Ltd.) was added to the sealing member to obtain conductivity between opposing first and second substrates. Since the sealing member was formed on the light shielding layer, it was difficult to be seen from a side of the light shielding layer.

These substrates were opposed, and a thermocompression bonding step was conducted to cure the sealing member. An injection hole and terminal portion, were formed. A nematic liquid crystal was injected by a vacuum injection method. A UV curing epoxy resin was applied to the injection hole to seal it. When the scattering of gaps in the segment portions was measured, the deviation was up to about 0.3 μm at the maximum and a cell having excellent uniformity was formed.

Then, a pair of polarizers were attached to the cell at predetermined angles so that the polarizing axes were parallel to each other at both sides of the substrates, whereby a color liquid crystal display cell was manufactured.

The cell thus formed was driven at a duty ratio of 1/8. A back light comprising CCT having the spectra of three colors of R, G and B was disposed as a light source at a rear side of the cell. When the cell was observed from a side where the light shielding layer was formed, the visual angle was wide and excellent visibility could be provided.

COMPARATIVE EXAMPLE 1

An ITO; transparent conductive film was formed on a glass substrate and the film was patterned. A carbon black coated dispersion type ink was put on a first substrate by an offset printing to form a layer of 2 μm thick so that a light shielding layer was formed on a segment type display portion and a portion inside a periphery sealing member. The OD value of the film was 1.7 and the insulation resistance was $3 \times 10^{13}$ Ω/□. On a second substrate, light transmitting layers were formed at predetermined positions by using color inks and a screen printing method. Aligning films were formed on these substrates to provide a pre-tilt angle of 1.3°. Rubbing was conducted so as to have a twist angle of 90°, and spacers of 6 μm were dispersed. Then, a cell was formed in the same manner as Example 1. Then, a nematic liquid crystal was injected and the injection hole was sealed.

Polarizers were attached to the cell and a tungsten lamp as a back light was disposed at a rear side of the cell. When the cell was driven at a duty ratio of 1/8 and it was observed from a side of the light shielding layer where the printing was conducted, the visual angle was slightly narrow. In careful observation of edge portions of the segment type display portion, a domain was found and expected characteristics of the cell could not be obtained. The measurement of the degree of scattering of the cell gaps has revealed a degree of scattering of 2.2 μm at the most in the display surface, which was resulted from the narrow visual angle. In the measurement under direct sunlight, there was found a scattering of light which may be resulted from particles of pigment printed on the cell surface and a reduction in contrast ratio.

EXAMPLE 2

A substrate obtained by forming an alkali-preventing layer of silica on a glass substrate by sputtering to have a thickness of about 200 Å was used. The material for a light shielding layer (V-259BKIS-H manufactured by, Nippon Steel Chemical Co., Ltd.) was coated to form a layer of about 1 μm thick on the substrate by a spin coating method. Light exposure of 300 mJ was conducted by using a photomask which covered a display portion of segment type and a portion extended from the outside of a periphery sealing member to be provided at the periphery of the liquid crystal cell. After the light exposure, developing, drying and baking were conducted. The OD value of the film was 3.0 and the insulation resistance, was $1 \times 10^{14}$ Ω/□.

On the substrate with light shielding layer thus formed, an ITO; transparent conductive film of about 2,000 Å was formed at 230° C. by sputtering method. The surface resistance was about 10 Ω/□. A photoresist was coated on the substrate. Then, light exposure and developing were conducted by using a photomask which covered a portion of wiring so that a voltage was applied to the segment display portion. An unnecessary portion in the ITO film was removed by an etching liquid, and then, the resist was removed by an aqueous NaOH solution whereby a transparent electrode was formed.

On another substrate to be opposed, an alkali-preventing layer and an ITO; transparent conductive films were formed successively in the same manner as above whereby a transparent electrode was formed.

On the substrate on which the light shielding layer was formed, a film having a thickness of about 600 Å was formed by a transfer printing method with use of an aligning film for providing a pre-tilt angle of about 2°. In order to form an inorganic type insulation film mixed with titania and silica on the substrate to be opposed, a film printing work was conducted by a sol-gel method. Then, an aligning film was formed and baked in the same manner as above. A rubbing treatment was conducted so that a twist angle of 90° was formed between the substrates.

On the first substrate, spacers of a diameter of 5 μm (manufactured by Sekisui Fine Chemical Co., Ltd.) were scattered. On the second substrate, Structbond (tradename) (manufactured by Mitsui Chemicals, Inc.) as a thermoset epoxy resin was printed to form the periphery sealing member by a screen printing in a portion corresponding to the periphery of the liquid crystal cell. 3% of conductive beads (manufactured by Sekisui Fine Chemical Co., Ltd.) was added as a transfer material to the sealing member to obtain conductivity between the substrates to be opposed. Further, 5% of glass fibers was added to keep the seal gap. Since the periphery sealing member was formed on the light shielding layer, it was difficult to be seen from a side of the light shielding layer.

These substrates were opposed and a thermo-compression bonding step was conducted to cure the sealing member. An injection hole and terminal portions were formed. A nematic liquid crystal having Δn of 0.077 was injected by the vacuum injection method. A UV curing epoxy resin was coated to the injection hole to seal it. The measurement of the gap width of segment portions has revealed to be about 6 μm which was equal to the sum of the thickness of the spacer and the thickness of the light shielding layer. Therefore it was confirmed that the spacers do not sink in the light shielding layer. The measured value of Δnd of the cell was 0.46. The deviation of the gap in the display surface was up to about 0.3 μm at the most, and the cell having excellent uniformity was obtained.

A pair of polarizers were attached to the cell at predetermined angles so that the polarization axes were parallel to each other at both sides of the substrates, and liquid crystal display cell was formed. The cell thus formed was driven at a duty of 1/2. A back light of tungsten lamp was disposed at a rear side of the cell. When the cell was observed from a side of the substrate where the light shielding layer was formed, a contrast ratio of 300:1 could be achieved in front view, and it was confirmed that the cell has excellent visibility.

COMPARATIVE EXAMPLE 2

An ITO; transparent conductive film was formed on a glass substrate (a first substrate) and the film was patterned. A light shielding layer was formed to have a thickness of 4 μm on the first substrate by the offset printing method so that the light shielding layer was formed in a segment type display portion and a portion inside a periphery sealing member. The OD value of the film was 2.5. Aligning films were formed on the first substrate and a substrate to be opposed (a second substrate) so that a pre-tilt angle of 2° was formed between these substrates. Rubbing was conducted to provide a twist angle of 90°. A cell was formed by interposing spacers of 6 μm. Then, the same nematic liquid crystal as in Example 2 was injected and sealed. A time for the injection was 4 times as much as a time required in Example 2. When the gap width and the uniformity were examined after the sealing, it was found that the gap width was 6.2 μm and the spacers sank deeply in the printed light shielding layer. Further, it was also found that there was a scattering of gap of at most 2.2 μm in the display surface.

After the attachment of polarizers, the cell was driven at a duty of 1/2. A back light of tungsten lamp was disposed at a rear side of the cell. In the observation from a side where the light shielding layer was printed, the contrast in front view was 150:1 in average, however, there were found partially 200:1 and 100:1 due to an uniform gap. Further, in the observation under direct sunlight, it was found that scattering takes place in a top surface of the cell and the contrast ratio was slightly reduced.

EXAMPLE 3

A substrate obtained by forming an alkali-preventing layer of silica on a glass substrate by sputtering to have a thickness of about 200 Å was used. A mother substrate in which a plurality of cells of 80 mm×80 mm were arranged was prepared in the following steps. The material for the light shielding layer (V-259BKIS-H manufactured by Nippon Steel Chemical Co., Ltd.) was coated to form a layer of about 1 μm thick on the substrate by spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

On the substrate with the light shielding layer thus formed, an ITO; transparent conductive film of about 2,000 Å was formed at 230° C. by a sputtering method. The surface resistance was about 10 Ω/□. A photoresist was coated on the substrate, and light exposure and developing were conducted with use of a photomask which covered a portion of wiring so that a voltage was applied to the segment display portion. An unnecessary portion in the ITO film was removed by an etching liquid, and then, the resist was removed by an aqueous NaOH solution whereby a transparent electrode was formed. On another substrate to be opposed, an alkali-preventing layer and an ITO film were formed successively, and a transparent electrode was formed in the same manner as above.

On the substrate on which the light shielding layer was formed, a film having a thickness of about 600 Å Was formed by a transfer printing method with use of an aligning film for providing a pre-tilt angle of about 2°. In order to form an inorganic type insulation film mixed with titania and silica on the substrate to be opposed, a film printing work was conducted by a sol-gel method. Then, an aligning film was formed and baked in the same manner as above. Rubbing was conducted to both the substrates so as to provide a twist angle of 90°.

On the first substrate, spacers having a diameter of 4 µm (manufactured by Sekisui Fine Chemical Co., Ltd.) were scattered. On the second substrate, Structbond (tradename) (manufactured by Mitsui Chemicals, Inc.) as a thermoset epoxy resin was printed to form a sealing member by screen printing method in a portion corresponding to the periphery of the liquid crystal cell and a portion where there was a light shielding layer bout upper and lower electrodes did not face each other. 3% of conductive beads (Sekisui-Fine Chemical Co., Ltd.) as a transfer material was added to the sealing member to obtain electric conductivity between the substrates, and 5% of glass fibers was added to keep the seal gap. Since the sealing member was formed on the light shielding layer, it was difficult to be seen from a side of the light shielding layer.

These substrates were opposed, and a thermo-compression bonding step was conducted to cure the sealing member. An injection hole and terminal portions were formed. A nematic liquid crystal was injected by a vacuum injection method. A UV curing epoxy resin was applied to the injection hole to seal it. When the scattering of gap width in the segment portions was measured, the deviation of gap width was about 5 µm which was roughly equal to the sum of the thickness of the spacers and the thickness of the light shielding layer. Accordingly, it was confirmed that the spacers did not sink in the light shielding layer.

The deviation of gap in the display portion was within about 0.2 µm at the most, and the cell having excellent uniformity of gap between a central portion and a peripheral portion was obtained. A pair of polarizers were attached to the cell at predetermined angels so that the polarization axes were parallel to each other at both sides of the substrates. A plastic sheet having divided color portions in correspondence to the segment portions of display by color printing was attached to a rear sides of the cell which faces the back light whereby a liquid crystal cell was completed.

The cell thus formed was driven at a duty of 1/2. A back light of tungsten lamp was disposed at a rear side of the cell. When the cell was observed from a side where the light shielding layer was formed, it was found that a contrast ratio of about 300:1 could be achieved in a central portion and a peripheral portion of the cell, and the cell had uniform characteristics.

EXAMPLE 4

A substrate obtained by forming an alkali-preventing layer of silica on a glass substrate by sputtering to have a thickness of about 200 Å was used. A mother substrate in which a plurality of cells of 80 mm×80 min were arranged was prepared by the following steps. The material for a light shielding layer (V-259BKIS-H manufactured by Nippon Steel Chemical Co., Ltd.) was coated to form a layer of about 1 µm thick on the substrate by a spin coating method.

Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

On the substrate with the light shielding layer thus formed, an ITO; transparent conductive film of about 2,000 Å was formed at 230° C. by a sputtering method. The surface resistance was about 10 Ω/□.

A photoresist was coated on the substrate thus formed, and light exposure and developing were conducted with use of a photomask which covered a portion of wiring so that a voltage was applied to the segment type display portion. Then, an unnecessary portion of the ITO film was removed by an etching liquid, and the resist was removed by an aqueous NaOH solution whereby a transparent electrode was formed. On a substrate to be opposed, an alkali-preventing layer and an ITO film were formed successively, and a transparent electrode was formed in the same manner as above.

On the substrate on which the light shielding layer was formed, a film was formed to have a thickness of about 600 A by a transfer printing method with use of an aligning film for providing a pre-tilt angle of about 2°. In order to form an inorganic type insulation film mixed with titania and silica on the substrate to be opposed, a film printing work was conducted by a sol-gel method. Then, an aligning layer was formed and baked in the same manner as above. Rubbing was conducted to both the substrates so as to provide a twist angle of 90°.

On the first substrate, spacers having a diameter of 4 µm (manufactured by Sekisui Fine Chemical Co., Ltd.) were scattered. On the second substrate to be opposed, Structbond (tradename) (manufactured by Mitsui Chemicals, Inc.) as a thermoset epoxy resin was printed to form the periphery sealing member by a screen printing method in a portion corresponding to the periphery of the liquid crystal cell. 3% of conductive beads (by Sekisui Fine Chemical Co., Ltd.) was added as a transfer material to the sealing member to obtain conductivity between the substrates and 5% of glass fibers was added to keep the seal gap. Since the sealing member was formed on the light shielding layer, it was difficult to be seen from a side of the light shielding layer.

These substrates were opposed and a thermo-compression bonding step was conducted to cure the sealing member. An injection hole and terminal portions were formed. Then, a nematic liquid crystal was injected by a vacuum injection method. A UV curing epoxy resin was applied to the injection hole to seal it. The measurement of the gap width of the segment portions has revealed to be about 5 µm which was roughly equal to the sum of the thickness of the spacer and the light shielding layer. Accordingly, it was confirmed that the spacers did not sink in the light shielding layer.

The deviation of the gap in the display portion was within about 0.5 µm at the most, and the cell wherein a slightly larger deviation was found between a central portion and a peripheral portion of the cell was obtained.

Then, a pair of polarizers were attached to the cell at predetermined angles so that the polarization axes were in parallel to each other at both sides of the substrates whereby a liquid crystal cell was formed.

The cell thus formed was driven at a duty of 1/2. A back light of tungsten lamp was disposed at a rear side of the cell. When the cell was observed from a side where the light shielding layer was formed, a contrast ratio of 250:1 in front view was achieved, and the visibility without any problem in practical use was confirmed.

COMPARATIVE EXAMPLE 3

An ITO; transparent conductive film was formed on a glass substrate and the film was patterned. A carbon black coated dispersion type ink was off-set printed to form a light shielding layer of 4 μm thick on a first substrate so that the light shielding layer was formed in a segment type display portion and a portion inside a periphery sealing member. The OD value of the film was 3.4 and the insulation resistance was $1.5 \times 10^{13}$ Ω/□. Aligning films were formed on the first substrate as well as a substrate to be opposed (a second substrate) to provide a pre-tilt angle of 2°. Rubbing was conducted to provide a twist angle of 90° of liquid crystal. Spacers of 4 μm were scattered. Thus, a cell was formed.

Then, the same nematic liquid crystal as in Example, 3 was injected. After the injection, the gap width and the uniformity were examined. As a result, it was found that the gap width was 6 μm and discoloration was generated due to unevenness of the gap in a central portion and a peripheral portion of the cell. There was also found a deviation of gap of 2.6 μm at the maximum in the display portion. The cell was sealed under a pressure of 0.2 kg/□ after the injection. The gap width was again examined. The gap width was reduced to 5.5 μm and the deviation of gap in the display portion was 1.0 μm.

Polarizers were attached to the cell and the cell was driven at a duty of 1/2. A back light of tungsten lamp was disposed at a rear side of the cell. In the observation of the cell from a side where the light shielding layer was printed, the contrast ratio in front view was 200:1. Further, there was found portions having discoloration due to unevenness of gap.

EXAMPLE 5

On a glass substrate, an alkali-preventing layer of silica was formed to be a thickness of about 200 Å by a sputtering method. Then, an ITO; transparent conductive film of about 2,000 Å was formed at 300° C. by the sputtering method. The surface resistance was about 10 Ω/□. A photoresist was coated on the substrate, and light exposure and developing were conducted with use of a photomask which covered a portion of wiring so that a voltage was applied to a segment type display portion. Then, an unnecessary portion of the ITO film was removed by an etching liquid and the resist was removed by an aqueous NaOH solution whereby an electrode substrate wag formed.

On the substrate, the material for a, light shielding layer (V-259BKIS-H manufactured by Nippon Steel Chemical Co., Ltd.) was coated to form a layer of about 1 μm thick by a spin coating method. Light exposure of 300 mJ was conducted by using a photomask which covered the segment display portion and a portion inside a periphery sealing member to be provided at the periphery of the liquid crystal cell. Then, developing, drying and baking were conducted. The OD value of the film was 3.0 and the insulation resistance was $1 \times 10^{14}$ Ω/□. On a substrate to be opposed, an alkali-preventing layer and an ITO; transparent conductive film were formed successively to prepare an electrode substrate in the same manner as above.

On the substrate on which the light shielding layer was formed, a film having a thickness of about 600 Å was formed by transfer printing method with use of an aligning film for providing a pre-tilt angle of about 2°. In order to form an inorganic type insulation film mixed with titania and silica on the substrate to be opposed, a film printing work was conducted by a sol-gel method. An aligning film was formed and baked in the same manner as the above. Rubbing was conducted to both the substrates so as to form a twist angle of 90°.

On the first substrate, spacers having a diameter of 5 μm (manufactured by Sekisui Fine Chemical Co., Ltd.) were scattered. On the second substrate, Structbond (tradename) (Mitsui Chemicals, Inc.) as a thermoset epoxy resin was printed to form the periphery sealing member by a screen printing method in a portion corresponding to the periphery of the liquid crystal cell. 3% of conductive beads (Sekisui Fine Chemical Co., Ltd.) was added as a transfer material to the sealing member so as to obtain conductivity between the substrates. Further, spacers having a diameter of about 6 μm which corresponds to the thickness of the light shielding layer to keep the seal gap, were added. Since the sealing member is formed outside of the light shielding layer, the sealing member was observed from a side of the light shielding layer.

These substrates were opposed, and a thermo-compression bonding step was conducted to cure the sealing member. An injection hole and terminal portions were formed. A nematic liquid crystal was injected by a vacuum injection method. A UV curing epoxy resin was applied to the injection hole to seal it. The measurement of the gap width of segment portions has revealed to be about 6 μm which was roughly equal to the sum of the thickness of the spacers and the thickness of the light shielding layer. Accordingly, it was confirmed that the spacers did not sink in the light shielding layer. The deviation of the gap in the display portion was about 0.3 μm at the most, and the cell having excellent uniformity was obtained.

Then, a pair of polarizers were attached to the cell at predetermined angles so that the polarization axes were in parallel to each other at both sides of the substrates whereby a liquid crystal cell was formed.

The cell thus formed was driven at a duty of 1/2. A back light of tungsten lamp was disposed at a rear side of the cell. In the observation of the cell from the surface side which was opposite the side where the light shielding layer was formed, a contrast ratio of 300:1 in front view was achieved. Although the effective display surface area was slightly narrow since the sealing member was observed at the periphery of the cell, excellent visibility was confirmed.

EXAMPLE 6

A substrate obtained by forming an alkali-preventing layer of silica on a glass substrate by sputtering method to have a thickness of about 200 Å was used. The material for a light shielding layer (V-259BKIS-H manufactured by Nippon Steel Chemical Co., Ltd.) was coated to form a layer of about 1 μm thick on the substrate by a spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

For providing desired colors, three photomasks were prepared so as to form light transmitting layers in the segment portions and color resins of R, G and Y (V-259R-H, V-259G-H and V-259Y-H manufactured by Nippon Steel Chemical Co., Ltd.) were coated successively, followed by conducting exposure, developing, drying and baking. The insulation resistance of the transparent films formed was $3 \times 10^{14}$ Ω/□. These light transmitting layers were formed to cover a portion slightly smaller than an outer contour of the cell so as not to contact with the periphery sealing member. The gaps between the colors were determined to be 0.3 mm so that there was no overlapping of the colors.

On the color substrate thus formed, an ITO; transparent conductive film of about 1,000 Å was formed at 230° C. by a sputtering method. The surface resistance was about 30 Ω/□. A photoresist was coated on the substrate, and light exposure and developing were conducted with use of a photomask which covered a portion of wiring so that a voltage was applied to the segment display portion. Then, an unnecessary portion of the ITO film was removed by an etching liquid, and the resist was removed by an aqueous NaOH solution whereby an electrode substrate was formed. On a substrate to be opposed, an alkali-preventing layer and an ITO; transparent conductive film were formed successively to prepare an electrode substrate in the same manner as above.

On the substrate on which the light shielding layer and the light transmitting layers were formed, a film was formed to have a thickness of about 600 Å by a transfer printing method by using an aligning film for providing a pre-tilt angle of 2°. On the substrate to be opposed, a film printing work was conducted by a sol-gel method so as to form an inorganic type insulation film mixed with titania and silica. An aligning film was formed and baked in the same manner as above. Rubbing was conducted to both the substrate so as to provide a twist angle of 70°.

On the first substrate, spacers of 5 μm diameter (Sekisui Fine Chemical Co., Ltd.) were scattered, and on the second substrate to be opposed, Structbond (tradename) (Mitsui Chemicals, Inc.) as a thermoset epoxy resin was printed to form the periphery sealing member by a screen printing method at a portion corresponding to the periphery of the liquid crystal cell. 3% of conductive beads (Sekisui Fine Chemical Co., Ltd.) was added as a transfer material to the sealing member so as to obtain conductivity between the substrates. Further, 5% of glass fibers was added to keep the seal gap. Since the sealing member was formed on the light shielding layer, it was difficult to be seen from a side of the light shielding layer.

These substrates were opposed. A thermo-compression bonding step was conducted to cure the sealing member. An injection hole and terminal portions were formed. A nematic liquid crystal was injected by a vacuum injection method. A UV curing epoxy resin was applied to the injection hole to seal it. The measurement of the gap width of the segment portions has revealed to be about 6 μm which was roughly equal to the sum of the thickness of the spacers and the thickness of the light shielding layer. Accordingly, it was confirmed that the spacers did not sink in the light shielding layer. The deviation of gap in the display portion was within about 0.3 μm at the most. The cell having excellent uniformity was formed.

Then, a pair of polarizers were attached to the cell at predetermined angles so that the crossing angle of the polarization axes was 70° between both sides of the substrates whereby a liquid crystal cell was prepared. The cell thus prepared was driven at a duty of 1/2. A back light comprising a white LED having the spectra of R, G and B was disposed at a rear side of the cell. When the cell was observed from a side where the light shielding layer was formed, a contrast ratio of 300:1 could be achieved in a direction which was inclined 30° toward the primary visual angle with respect to a front view, and therefore, the cell having excellent visibility could be confirmed. Further, since the light transmitting layers were formed on the inner surface, the excellent display characteristics could be obtained without any color shift even in view from an opposite direction.

EXAMPLE 7

A substrate obtained by forming an alkali-preventing layer of silica on a glass substrate by sputtering to have a thickness of about 200 Å was used. The material for a light shielding layer (V-259BKIS-H manufactured by Nippon Steel Chemical Co., Ltd.) was coated to form a layer of about 1 μm thick by a spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

On the substrate provided with the light shielding layer thus formed, an ITO; transparent conductive film of about 2,000 Å was formed at 230° C. by a sputtering method. The surface resistance was about 10 Ω/□. A photoresist was coated on the substrate, and light exposure and developing were conducted with use of a photomask which covered a portion of wiring so that a voltage was applied to a segment display portion. Then, an unnecessary portion of the ITO film was removed by an etching liquid and the resist was removed by an aqueous NaOH solution whereby a transparent electrode was formed. On a substrate to be opposed, an alkali-preventing layer and an ITO; transparent conductive film were formed successively whereby a transparent electrode was formed in the same manner as the above.

On the substrate on which the light shielding layer was formed, a film was formed to have a thickness of about 600 Å by a transfer printing method with use of an aligning film for providing a pre-tilt angle of about 2°. On the substrate to be opposed, a film printing work was conducted by a sol-gel method to form an inorganic types insulation film mixed with titania and silica. Then, an aligning film was formed and baked in the same manner is above. Rubbing was conducted to both the substrates to provide a twist angle of 90°.

On the first substrate, spacers having a diameter of 5 μm (Sekisui Fine Chemical Co., Ltd.) were scattered, and on the substrate to be opposed, Structbond (tradename) (Mitsui Chemicals, Inc.) as a thermoset epoxy resin was printed to form the periphery sealing member by a screen printing method in a portion corresponding to the periphery of the liquid crystal cell. 3% of conductive beads (Sekisui Fine Chemical Co., Ltd.) was added as a transfer material to the sealing member so as to obtain conductivity between the substrates, and 5% of glass fibers was added to keep the seal gap. Since the sealing member was formed on the light shielding layer, it was difficult to be seen from a side of the light shielding layer.

These substrates were opposed. A thermo-compression bonding step was conducted to cure the sealing member. An injection hole and terminal portions were formed. A nematic liquid crystal was injected by a vacuum injection method. A UV curing epoxy resin was applied to the injection hole to seal it. The measurement of the gap width of the segment portions has revealed to be about 6 μm which was roughly equal to the sum of the thickness of the spacers and the thickness of the light shielding layer. Accordingly, it was confirmed that the spacers did not sink in the light shielding layer. Further, the deviation of gap in the display portion was within about 0.3 μm at the most. The cell having excellent uniformity could be obtained.

Then, "WIDE VIEW" (manufactured by Fuji Photo Film Co., Ltd.) as a visual angle widening film was disposed at each side of the cell, and a pair of polarizers were attached to the cell at predetermined angles so that the polarizing axes were in parallel to each other whereby a liquid crystal cell was formed.

The cell thus formed was driven by a static driving method. When the cell was observed from a side of the substrate on which the light shielding layer was formed, it was confirmed that the cell had excellent visibility showing a contrast ratio of 300:1 in front view and at contrast ratio of not less than 200:1 in a range of 0°–30° with respect to the view from a normal angle.

EXAMPLE 8

A substrate obtained by forming an alkali-preventing layer of silica on a glass substrate by sputtering to have a thickness of about 200 Å was used. The material for a light shielding layer (V-259BKIS-H manufactured by Nippon Steel Chemical Co., Ltd.) was coated to form a layer of about 1 μm thick on the substrate by a spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

For providing desired colors, three photomasks were prepared so as to form light transmitting layers in segment portions, and color resins of R, G and Y (V-259R-H, V-259G-H and V-259Y-H manufactured by Nippon Steel Chemical Co., Ltd.) were coated successively by spin coating, followed by exposure, developing, drying and baking. The insulation resistance of each light transmitting film was $3 \times 10^{14}$ Ω/□. These light transmitting layers were formed to cover a display portion which was slightly smaller than an outer contour of the cell so as not to contact with the periphery sealing member. Further, the gaps were determined to be 0.3 mm so that there was no overlapping of the colors.

On the color substrate thus formed, an ITO; transparent conductive film of about 1,000 Å was formed at 230° C. by sputtering. The surface resistance was about 30 Ω/□. A photoresist was coated on the substrate, and then, light exposure and developing were conducted with use of a photomask which covered a portion of wiring so that a voltage was applied to segment portions. An unnecessary portion of the ITO film was removed by an etching liquid and the resist was removed by an aqueous NaOH solution whereby a transparent electrode was formed. On a substrate to be opposed, an alkali-preventing layer and an ITO; transparent conductive film were formed successively whereby a transparent electrode was formed in the same manner as above.

On the substrate on which the light shielding layer and the light transmitting layers were formed, a film was formed to have a thickness of about 600 Å by a transfer printing method by using an aligning film for providing a pre-tilt angle of 5°. In order to form an inorganic type insulation film mixed with titania and silica on the substrate to be opposed, a film printing work was conducted by a sol-gel method. An aligning film was formed and baked in the same manner as above. Rubbing was conducted to both the substrates so as to provide a twist angle of 240°.

On the first substrate, spacers having a diameter of 6 μm (Sekisui Fine Chemical Co., Ltd.) were scattered, and on the second substrate to be opposed, Structbond (tradename) (Mitsui Chemicals, Inc.) was printed to form the periphery sealing member by a screen printing method at a portion corresponding to the periphery of the liquid crystal cell. 3% of conductive beads (Sekisui Fine Chemical Co., Ltd.) was added as a transfer material to the sealing member to obtain conductivity between the substrates. Since the sealing member was formed on the light shielding layer, it was difficult to be seen from a side of the light shielding layer.

These substrates were opposed, and a thermo-compression bonding step was conducted to cure the seal member. An injection hole and terminal portions were formed. A nematic liquid crystal was injected by a vacuum injection method. A UV curing epoxy resin was applied to the injection hole to seal it. In the measurement of the scattering of the gap width of segment portions has revealed a scattering within about 0.3 μm at most. The cell having excellent uniformity was formed.

Then, a biaxially stretched retardation film having a predetermined phase difference value was disposed at each side of the cell, and further, a pair of polarizers were attached to the outside of the retardation films so that the polarization axes intersect at a right angle whereby a color liquid crystal cell was completed.

The cell thus formed was driven at a duty of 1/32. A back light of tungsten lamp was disposed at a rear side of the cell. When the cell was observed from a side where the light shielding layer was formed, it was found that the visual angle was broader than that the cell of TN system which was driven at a duty of 1/8, and excellent visibility was obtained.

EXAMPLE 9

A substrate obtained by forming an alkali-preventing layer of silica on a glass substrate by sputtering was used. The material for a light shielding layer (V-259BKIS-H manufactured by Nippon Steel Chemical Co., Ltd.) was coated to form a layer of about 1 μm thick on the substrate by spin coating. Light exposure of 300 mJ was conducted by using a photomask which covered a display portion of segment type and a portion extended from the outside of a periphery sealing member to be provided at the periphery of the liquid crystal cell. Then, the developing, drying and baking were conducted. The OD value of the film was 3.0 and the insulation resistance was $1 \times 10^{14}$ Ω/□.

For providing desired colors, three photomasks were prepared so as to form light transmitting layers in the segment portions, and color resins of R, G and Y (V-259R-H, V-259G-H and V-259Y-H manufactured by Nippon Steel Chemical Co., Ltd.) were coated successively by spin-coating, followed by exposure, developing, drying and baking. The insulation resistance of the light transmitting films obtained was $3 \times 10^{14}$ Ω/□. These light transmitting layers were formed to cover a display portion which was slightly smaller than an outer contour of the cell so as not to contact with the periphery sealing member. The gaps between the colors were determined to be 0.3 mm so that there are no overlapping of colors.

On the color substrate thus formed, an ITO; transparent conductive film of about 1,000 Å was formed at 230° C. by sputtering. The surface resistance was about 30 Ω/□. A photoresist was coated on the substrate, and then, light exposure and developing were conducted with use of a photomask which covered a portion of wiring so that a voltage was applied to the segment display portion. An unnecessary portion of the ITO film was removed by an etching liquid and then, the resist was removed by an aqueous NaOH solution whereby a transparent electrode was formed. On another substrate to be opposed, an alkali-preventing layer and an ITO; transparent conductive film were formed successively and a transparent electrode was formed in the same manner as the above.

On the substrate on which the light shielding layer and the light transmitting layers were formed, a film was formed to have a thickness of about 600 Å by a transfect printing method with use of an aligning film for proving a pre-tilt angle of 5°. In order to form an inorganic type insulation film mixed with titania and silica on the substrate to be opposed, a film printing work was conducted by a sol-gel method. Then, an aligning film was formed and baked in the same manner as above. Rubbing was conducted to both the substrates so that a twist angle of 240° was formed between the substrates.

On the first substrate, spacers having a diameter of 6 μm (Sekisui Fine Chemical Co., Ltd.) were scattered, and on the second substrate to be opposed, Structbond (tradename) (Mitsui Chemicals, Inc.) was printed to form the periphery sealing member by a screen printing method at a portion corresponding to the periphery of the liquid crystal cell. 3% of conductive beads (Sekisui Fine Chemical Co., Ltd.) was added as a transfer material to the sealing member to obtain conductivity between the substrates. Since the sealing member was formed on the light shielding layer, it was difficult to be seen from a side of the light shielding layer.

These substrates were opposed. A thermocompression bonding step was conducted to cure the sealing member. An injection hole and terminal portions were formed. Then, a nematic liquid crystal was injected by a vacuum injection method. A UV curing epoxy resin was applied to the injection hole to seal it. The measurement of the scattering of the gap with of segment portions has revealed a scattering of about 0.3 μm at the most, and the cell having excellent uniformity was formed.

Then, a uniaxially stretched retardation film was disposed at each side of the cell to have a predetermined angle, and a pair of polarizers were attached to the outer sides of the retardation films at predetermined angles whereby a color liquid crystal cell was completed.

The cell thus formed was driven at a duty of 1/32. A back light comprising a white CCT having the spectra of R, G and B was disposed at a rear side of the cell. When cell was observed from a side where the light shielding layer was formed, it was found that the visual angle was broader than that of TN system driven at a duty of 1/8, and the visibility was excellent.

EXAMPLE 10

A substrate obtained by forming an alkali-preventing layer of silica on a glass substrate by sputtering was used. The material for a light shielding layer (V-259BKIS-H manufactured by Nippon Steel Chemical Co., Ltd.) was coated to form a layer of 1 μm thick on the substrate by a spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 3.0 and the insulation resistance was $1 \times 10^{14}$ Ω/□.

The pattern used was such that a so-called F plate in which the light shielding layer was disposed at a side of an observer and a so-called R plate in which the light shielding layer was disposed at a side opposite the observer were alternately arranged. For providing desired colors, three photomasks were prepared so as two form light transmitting layers in the segment portions, and color resins of R, G and Y (V-259R-H, V-259G-H and V259Y-H manufactured by Nippon Steel Chemical Co., Ltd.) were coated successively by spin coating, followed by exposure, developing, drying and baking. The insulation resistance of the obtained light transmitting films was 3×10Ω/□. These light transmitting layers were formed in a display portion which was slightly smaller than an outer contour of the cell so as not to contact with the periphery sealing member. The gaps were determined to be 0.3 mm so that there was no overlapping of the colors.

On the color substrate thus formed, an ITO; transparent conductive film of about 1,000 Å was formed at 230° C. by sputtering. The surface resistance was about 30 Ω/□. A photoresist was coated on the substrate, and then, light exposure and developing were conducted with use of a photomask which covered a portion of wiring so that a voltage was applied to the segment display portion which was so designed as to correspond to the patterns of F and R of the light shielding layer. Then, an unnecessary portion of the ITO film was removed by an etching liquid, and the resist was removed by an aqueous NaOH solution whereby a transparent electrode was formed. Designing was so made that the gaps between wirings in the ITO film were at least about 70 μm and the covering proportion of the ITO film formed on the display area was 90% or more.

On the substrate to be opposed, an alkali-preventing layer and an ITO; transparent conductive film were formed successively, and a transparent electrode was formed by using a photomask in which the patterns of F and R were alternately arranged. The distance between wirings was not made so narrow so that the thickness of the wirings was sufficient to keep a necessary line resistance.

On the substrate on which the light shielding layer and the light transmitting layers were formed, a film was formed to have a thickness of about 600 Å by a transfer printing method with use of an aligning film for providing a pre-tilt angle of 1.3°. In order to form an organic type insulation film mixed with titania and silica on the substrate to be opposed, a film printing, work was conducted by a sol-gel method. An aligning film was formed and baked in the same manner as above. Rubbing was conducted to both the substrates so as to provide a twist angle of 90°.

On the first substrate, spacers having a diameter of 6 μm (Sekisui Fine Chemical Co., Ltd.) were scattered, and on the second substrate to be opposed, Structbond (tradename) (Mitsui Chemicals, Inc.) was printed to form the periphery sealing member by screen-printing at a portion corresponding to the periphery of the liquid crystal cell. 3% of conductive beads (Sekisui Fine Chemical Co., Ltd.) was added as a transfer material to the sealing member to obtain conductivity between the, substrates. Since the sealing member was formed on the light shielding layer, it is difficult to be seen from a side of the light shielding layer.

These substrates were opposed. A thermocompression bonding step was conducted to cure the sealing member. An injection hole and terminal portions were formed. A nematic liquid crystal was injected by a vacuum injection method. A UV curing epoxy resin was coated to the injection hole to seal it. When the scattering of the gap width of segment portions was measured, the scattering was in a deviation of about 0.3 μm at the most, and the cell having excellent uniformity was formed.

A pair of polarizers were attached to the cell at predetermined angles so that the polarization axes were in parallel to each other at both sides of the cell whereby the color liquid crystal display cell was completed.

A back light was disposed at a rear side of the cell thus formed, and the cell was driven at a duty of 1/8. When the cell was observed from a side of the substrate on which the light shielding layer was formed, it showed a wide visual angle and excellent visibility in substantially the same manner as that of Example 1. Further, in the observation from the opposite side with respect to the light shielding layer, the visibility comparable with the observation from the light shielding layer side could be obtained provided that the cell was in the room. Under the condition of direct sunlight, the pattern of the wirings was not observed although the reflection of light on the top surface was slightly strong. And the cell which was practically usable could be obtained.

EXAMPLE 11

A mother substrate obtained by forming an alkali-preventing layer of silica on a glass substrate by sputtering to have a thickness of about 200 Å was used.

A model in which a plurality of liquid crystal panels of 80 mm×80 mm were arranged was prepared according to the following steps. The material for a light shielding layer (V-259BKIS-H manufactured by Nippon Steel Chemical Co., Ltd.) was coated to form a layer of about 0.5 μm thick by a spin coating method. Light exposure of 300 mJ was conducted by using a photomask which covered a display portion of segment type and a portion extended from the outside of a periphery sealing member to be provided at the periphery of the liquid crystal cell. Then, developing, drying and baking were conducted. The OD value of the film was 1.5 and the insulation resistance was $2\times10^{14}$ Ω/□.

On the substrate, a transparent conductive film of about 1,000 Å was formed at 230° C. by sputtering. The surface resistance was about 30 Ω/□. Then, a photoresist was coated thereon, and light exposure and developing were conducted by using a photomask which covered a portion of wiring so that a voltage was applied to a segment display portion. Then, an unnecessary portion of the ITO film was removed by an etching liquid and the resist was removed by an aqueous NaOH solution whereby an electrode substrate was prepared.

On another substrate to be opposed, an alkali-preventing layer and an ITO film were formed successively and an electrode substrate was prepared in the same manner as above.

On the substrate provided with the light shielding layer, a film of about 600 Å was formed by transfer-printing with use of a polyimide type aligning film.

In order to form an inorganic type insulation film mixed with titania and silica on the substrate to be opposed, a film printing work was conducted by a sol-gel method. Then, an aligning film was formed and baked in the same manner as above. Rubbing was conducted to both the substrates so as to direct the liquid crystal in the same direction in parallel.

On the first substrate, silica balls having a diameter of 1.5 μm (manufactured by Shokubai Kasei Kogyo K.K.) were scattered, and on the second substrate to be opposed, Structbond (tradename) (Mitsui Chemical, Inc.) was printed by a screen printing method so as to provide a support column-like arrangement in a portion corresponding to the periphery of the liquid crystal cell and a display portion covered with the light shielding layer. A sealing member containing conductive beads was printed on the substrate to be opposed at a position where the electrode was formed, so that the conductivity between the substrates was obtained. Since the sealing member was formed on the light shielding layer, it was difficult to be seen from a side of the light shielding layer.

These substrates were opposed. A thermocompression bonding step was conducted to cure the sealing member to thereby form an empty liquid crystal cell. An injection hole and terminal portions were formed. The empty liquid crystal cell and the injection hole were heated and an antiferrodielectric liquid crystal in an isotropic state was injected by a vacuum injection method. Then, a UV curing epoxy resin was applied to the injection hole to seal it. When the scattering of the gap of the segment portions was measured, it was within a deviation of about 0.1 μm at most. Thus, the cell having excellent uniformity was formed. In this case, the antiferrodielectric liquid crystal used was a blend having a phase series of "isotropic state—SmA—SmCA*—crystal" and showing an antiferrodielectric property (SmCA*) in a temperature range of about −10° C.—about +60° C.

A pair of polarizers were attached to both sides of the cell at predetermined angles so that the polarization axes intersect at a right angle and a light blocking state was provided under a condition that no voltage was applied, whereby an antiferrodielectric liquid crystal display panel was completed.

A back light comprising CCT was disposed at a rear side of the cell. When a 16-line driving was conducted according to a line-sequential addressing method utilizing the memories, a broad visual angle and excellent visibility could be obtained.

EXAMPLE 12

A mother substrate obtained by forming an alkali-preventing layer of silica on the glass substrate by sputtering to have a thickness of about 200 Å was used. A model in which a plurality of liquid crystal panels of 80 mm×80 mm were arranged was prepared according to the following steps. The material for a light shielding layer (V-259BKIS-H manufactured by Nippon Steel Chemical Co., Ltd.) was coated to form a layer of about 0.5 μm thick by spin coating. Light exposure of 300 mJ was conducted by using a photomask which covered a display portion of segment type and a portion extended from the outside of the periphery sealing member to be provided at the periphery of the liquid crystal cell. Then, developing, drying and baking were conducted. The OD value of the film was 1.5 and the insulation resistance was $2\times10^{14}$ Ω/□.

On the substrate, a transparent conductive film of about 1,000 Å was formed at 230° C. by sputtering. The surface resistance was about 30 Ω/□. A photoresist was coated, and then, light exposure and developing were conducted by using a photomask which covered a portion of wiring so that a voltage was applied to the segment display portion. An unnecessary portion of the ITO film was removed by an etching liquid and the resist was removed by an aqueous NaOH solution whereby an electrode substrate was prepared.

On another substrate to be opposed, an alkali-preventing layer and an ITO film were formed successively to prepare an electrode substrate in the same manner as above. On the substrate on which the light shielding, layer was formed, a film of about 600 Å thick was formed by a transfer printing method with use of a polyimide type aligning film. In order to form an inorganic type insulation film mixed with titania and silica on the substrate to be opposed, a film printing work was conducted by a sol-gel method. An aligning film was formed and baked in the same manner as above. Rubbing was conducted to both the substrates so as to direct liquid crystal in the same direction in parallel.

On the first substrate, silica balls having a diameter of 1.5 µm (Shokubai Kasei Kogyo K.K.) were scattered. On the second substrate to be opposed, Structbond (tradename) (Mitsui Chemicals, Inc.) was printed by screen printing so as to provide a support, column-like arrangement in a portion corresponding to the periphery of the liquid crystal cell and a display portion covered with the light shielding layer. A sealing member containing conductive beads was printed on the second substrate in a portion where the electrode was formed to obtain conductivity. Since the sealing member was formed on the light shielding layer, it was difficult to be seen from a side of the light shielding layer.

These substrates were opposed. A thermocompression bonding step was conducted to cure the material to form an empty liquid crystal cell. An injection hole and terminal portions were formed. Then, the empty liquid crystal cell and the injection hole were heated and an antiferrodielectric liquid crystal in a nematic state or an isotropic state was injected by a vacuum injection method. A UV curing epoxy resin was applied to the injection hole to seal it. In the measurement of the gaps of segment portions, there was found a deviation of about 0.1 µm at the most, and the cell having excellent uniformity could be obtained. In this case, the ferrodielectric liquid crystal used was a blend having a phase series of "isotropic state—N—SmA—SmC*—Crystal" and showing a ferrodielectric property (SmC*) in a temperature range of about −10° C.—about +60° C.

Then, a pair of polarizers were attached to the cell at predetermined angles with respect to the direction of orientation of liquid crystal molecules so that the polarization axes intersect at a right angle, and light shielding and light transmitting were switched by applying a voltage, whereby a ferrodielectric liquid crystal display panel was completed.

A back light comprising CCT was disposed at a rear side of the cell thus formed. When a 16-line driving was conducted according to a line-sequential addressing method utilizing the memories, the cell having a wide visual angle and excellent visibility could be obtained.

Industrial Applicability

As described above, the liquid crystal display device of the present invention makes gap widths in the cell to be uniform and makes the gap widths to be narrower. Therefore, the following advantages are obtainable: discoloration in the display portion can be minimized; a range of selection in display mode, optical designing of cell, liquid crystal material and so on can be widened; there are obtainable a display of high contrast ratio, a broader visual angle and a high response speed, and the final product having an excellent appearance.

Further, since the insulation properties of the light shielding layer are high, the transparent electrode can directly be formed thereon whereby the manufacturing steps can be simplified, and reliability on the transparent electrode at the terminal portions is increased.

Further, when the light shielding layer is extended to the beneath or an inner edge of the periphery sealing member, the leakage of light can effectively be prevented without providing another light shielding layer, and an effective display surface area can be increased.

Further, since the support column-like member having the same material as the periphery sealing member is disposed in at least a part of the light shielding layer in the display region, there is no danger of causing the swelling of a central portion of the cell without conducting a pressurized sealing method even in a liquid crystal cell which was conventionally difficult to form uniform gaps. Accordingly, the cell having uniformity in characteristics can be formed. In particular, in the conventional technique the cell using STN required the pressurized sealing method. With the above-mentioned construction, however, the cell having uniform gaps can be obtained without conducting the pressurized sealing method. In this case, it is unnecessary to prepare a sealing member for the support column since the sealing member for the support column is made of the same material as that of the periphery sealing member.

In a case of a liquid crystal display device using a ferrodielectric liquid crystal or an antiferrodielectric liquid crystal which does not exhibit self-repairing properties when the orientation is disturbed, the provision of the support column can improve the uniformity of gaps and prevent orientation disturbance due to an external stress, a shock or vibrations. Such structure is in particular effective when the liquid crystal display device is a car-mounted or portable liquid crystal display device.

A display panel with a light shielding layer has been used for a projection type display such as a head-up display. However, since a fine pattern could not be formed in the light shielding layer by the conventional printing method, the magnifying power in the projection type display was at most two times. However, in accordance with the present invention, fine processing is possible because a photolithography method can be utilized, and a quality capable of magnifying three times or more in the projection can be provided.

Further, a tungsten lamp, a Xenon lamp or EL has been used as the back light in which clearness of a color has not been much required. However, according to the present invention, a cell having a high chroma can be obtained in combination with a back light such as a white LED.

Obviously, numerous modifications and variations of the present invention are possible in light of the above teachings. It is therefore to be understood that within the scope of the appended claims, the invention may be practiced otherwise than as specifically described herein.

What is claimed is:

1. A transmissive type liquid crystal display device comprising a liquid crystal layer, a pair of transparent substrates opposed to each other and bonded to a periphery sealing member so as to interpose the liquid crystal layer, a polarizer placed at an outer surface of each of the transparent substrates, an illumination means provided in rear of a polarizer at a back surface side with respect to a display surface side, a light shielding layer provided on an inner surface of one of the transparent substrates at positions corresponding to a non-display region and a non-display portion excluding a portion corresponding to a display pattern in a display region, and a transparent electrode formed on the display region, wherein a voltage sufficient to activate the liquid crystal layer is applied to a desired portion of the transparent electrode on the display pattern, said liquid crystal display device being characterized in that: the non-display portion in the display region has a plurality of sections of not less than 1 mm×1 mm; the light shielding layer is made of a photosensitive light shielding resin in which patterning is conducted, which has an electrical insulation resistance value of not less than $10^{12}$ Ω/□ and an optical density (OD value) of not less than 2.0 per a film thickness of 1 μm.

2. The liquid crystal display device according to claim 1, wherein said transparent electrode is formed directly on said light shielding layer at said one of the transparent substrates without interposing an insulating smoothing layer.

3. The liquid crystal display device according to claim 1, wherein a support column made of the same material as the periphery sealing member is provided on at least a part of said light shielding layer in a non-display portion in said display region.

4. The liquid crystal display device according to claim 1, wherein a patterned light transmitting layer having a predetermined transmission color is formed to cover a portion corresponding to said display pattern, and said light transmitting layer is made of a photosensitive resin material having an electrical insulation resistance value of not less than $10^{12}$ Ω/□.

5. The liquid crystal display device according to claim 4, wherein said transparent electrode is formed directly on said light shielding layer and said light transmitting layer at said one of said transparent substrates without interposing an insulating smoothing layer.

6. The liquid crystal display device according to claim 4, wherein more than one patterned light transmitting layers having different predetermined transmission colors are formed to cover a portion corresponding to said display pattern, and said more than one light transmitting layers are made of a photosensitive resin material having an electrical resistance value of not less than $10^{12}$ Ω/□.

7. The liquid crystal display device according to claim 6, wherein said more than one light transmitting layers do not overlap and the gap between said more than one light transmitting layers is not more than 0.5 μm.

8. The liquid crystal display device according to claim 6, wherein said transparent electrode is formed directly on said light shielding layer and said more than one light transmitting layers at said one of said transparent substrate without interposing an insulating smoothing layer.

9. The liquid crystal display device according to claim 1, wherein said liquid crystal layer is a nematic liquid crystal layer having a twist angle of about 90° between the transparent substrates; said pair of polarizers are so arranged that their polarizing axes are in parallel, and the pre-tilt angle formed between the liquid crystal layer and the transparent substrates is 1.5° or less.

10. The liquid crystal display device according to claim 1, wherein said liquid crystal layer is a nematic liquid crystal layer having a twist angle of about 90° between the transparent substrates; said pair of polarizers are arranged so that their polarizing axes intersect at a right angle, and the product Δnd of the refractive index anisotropy Δn of the nematic liquid crystal and the distance d between the transparent conductive films which form the display pattern is in a range of 0.4–0.6 μm.

11. The liquid crystal display device according to claim 1, wherein said liquid crystal layer is a nematic liquid crystal layer having a twist angle of 70–80 degree between the transparent substrates; said pair of polarizers are arranged so that the crossing angle formed by their polarizing axes is 70–80°, and the product Δnd of the refractive index anisotropy Δn of the nematic liquid crystal and the distance between the transparent conductive films which form the display pattern is in a range of 0.4–0.6 μm.

12. The liquid crystal display device according to claim 1, wherein said liquid crystal layer is a nematic liquid crystal layer having a twist angle of 180–270° between the transparent substrates; a retardation film is disposed between at least one of the polarizers and a transparent substrate opposing thereto, and said pair of polarizers are arranged so that light shielding and light transmitting are switched by applying a voltage.

13. The liquid crystal display device according to claim 1, wherein said liquid crystal layer is a ferrodielectric liquid crystal or an anti-ferrodielectric liquid crystal; said pair of polarizers are arranged so that their polarizing axes intersect at a substantially right angle, and light shielding and light transmitting are switched by applying a voltage.

14. The liquid crystal display device according to claim 1, wherein said liquid crystal layer is a nematic liquid crystal layer, and the duty ratio for driving the nematic liquid crystal layer is 1/1–1/33.

15. The liquid crystal display device according to claim 1, wherein the liquid crystal layer is a nematic liquid crystal layer and the duty ratio for driving the nematic liquid crystal layer is 1/1–1/4.

16. The liquid crystal display device according to claim 1, wherein said liquid crystal layer is a nematic liquid crystal layer which contains a dichroic dye.

17. The liquid crystal display device according to claim 1, wherein said illumination means comprises a white color light source having the spectra of three colors of R, G and B.

18. The liquid crystal display device according to claim 1, wherein said light shielding layer is a resinous material obtained by polymerizing a resinous composition including an acid adduct of alkali-soluble epoxy acrylate including insulating carbon.

19. The liquid crystal display device according to claim 1, said light transmitting layer is a resinous material obtained by polymerizing a resinous composition including an acid adduct of alkali-soluble epoxy acrylate.

20. The liquid crystal display device according to claim 1, wherein said light shielding layer is provided in a lower portion of said periphery sealing member, and the edge portion of said light shielding layer is within the width of said periphery sealing member over the entire periphery.

21. The liquid crystal display device according to claim 1, wherein the cell gap is not more than 5 μm.

22. The liquid crystal display device according to claim 1, wherein the cell gap is not more than 3 μm.

* * * * *